(12) United States Patent
Kim et al.

(10) Patent No.: US 6,570,274 B2
(45) Date of Patent: May 27, 2003

(54) ELECTRIC MOTOR

(75) Inventors: Houng Joong Kim, Hitachi (JP); Kohji Maki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/793,525

(22) Filed: Feb. 27, 2001

(65) Prior Publication Data

US 2002/0053833 A1 May 9, 2002

(30) Foreign Application Priority Data

Nov. 6, 2000 (JP) ........................................ 2000-342377

(51) Int. Cl.⁷ ............................................... H02K 41/00
(52) U.S. Cl. ....................................................... 310/12
(58) Field of Search ............................. 310/12, 13, 14; 318/135

(56) References Cited

U.S. PATENT DOCUMENTS

| | | | | |
|---|---|---|---|---|
| 3,707,924 A | * | 1/1973 | Barthalon et al. | ............. 310/12 |
| 4,945,268 A | * | 7/1990 | Nihei et al. | ................... 310/12 |
| 5,426,353 A | * | 6/1995 | Stuhr et al. | ................... 318/15 |
| 6,373,162 B1 | * | 4/2002 | Liang et al. | ........... 310/156.53 |

FOREIGN PATENT DOCUMENTS

| JP | 408080083 A | * | 3/1996 | |
|---|---|---|---|---|
| JP | 8340533 | | 6/1998 | |

OTHER PUBLICATIONS

U.S. application Ser. No.: 09/959,615 is a 371 of PCT/JP00/02808 having a priority date of Apr. 27, 2000 and entitled: "Linear Motor and Production Method Therefor" along with an English Translation of the Application.

* cited by examiner

*Primary Examiner*—Nestor Ramirez
*Assistant Examiner*—Judson H. Jones
(74) *Attorney, Agent, or Firm*—Antonelli, Terry, Stout & Kraus, LLP

(57) ABSTRACT

With an electric motor formed according to a prior art, there is a relatively large amount of magnetic flux leaking between an armature and a secondary, resulting in a problem that an electric current is large but a desired output is small. In addition, since a magnetic attraction acts only in one direction between the armature and the secondary, there is a relatively large load on the support structures of the secondary, causing a distortion in the motor structure and some other disadvantages. In order to solve the above problems, the present invention provides an improved electric motor comprising an armature having a core formed by a magnetic material and having a coil wound around the core; and a secondary disposed within the armature with a clearance formed therebetween and supported to be relatively movable with respect to the armature.

15 Claims, 13 Drawing Sheets

ELECTRIC MOTOR

BACKGROUND OF THE INVENTION

1. Field of the Invention

The present invention relates to an electric motor, particularly to an electric motor which has an armature providing magnetic poles disposed with mutually facing magnetic poles being different from each other in their magnetic polarities energized by one coil.

2. Description of the Related Art

Conventionally, there have been in consideration various types of electric motors having different structures. However, each of the conventional electric motors is formed in a manner such that each of its poles has one or more than one winding coils.

In making a conventional electric motor, since one or more than one coils are wound around each pole, not only it is difficult to reduce a production cost, but also it is difficult to manufacture an electric motor having a relatively small pole pitch. Moreover, with regard to the structure of a linear motor, since there is a relatively large amount of magnetic flux leaking between an armature and a secondary, the motor's thrust with respect to an exiting current is thus comparatively small, resulting in a low motor efficiency. In addition, since an attraction force of magnetism acts only in one direction between the armature and the secondary, there is a relatively large load on a support structure of the secondary. As a result, a distortion in the motor structure and some other disadvantages, thus making it difficult to put the motor into practical use.

SUMMARY OF THE INVENTION

Accordingly, it is an object of the present invention to provide an improved electric motor capable of easily realizing a multiple polarization with the use of only one coil even if a pole pitch is small. Further, if an electric motor is a linear motor, such a linear motor is so formed that it is possible to reduce the leakage of magnetic flux passing between an armature and a secondary, thereby reducing an undesired magnetic attraction between the armature and the secondary.

One of the features of the present invention is that it is an electric motor which comprises an armature having a core formed by a magnetic material and having a coil wound around the core, and a secondary disposed with a clearance to the armature and supported to be relatively movable with respect to the armature. Specifically, the core has a plurality of pairs of mutually facing magnetic poles which are formed in a manner such that the secondary is allowed to be disposed between each pair of the magnetic poles, the plurality of magnetic poles are arranged in a direction in which the secondary is relatively movable with respect to the armature, every two mutually neighbouring magnetic poles arranged in the relatively movable direction on the secondary side are set to have mutually different magnetic polarities.

Namely, each pair of the magnetic poles are different in their magnetic polarities, a plurality of magnetic poles are arranged in a manner such that a flat plate like secondary or a circular cylindrical secondary may be interposed between each pair of magnetic poles, along a direction in which the secondary is relatively movable with respect to the armature. At this time, a plurality of pairs of magnetic poles arranged on the same one side of the secondary are alternatively different in their magnetic polarities along a direction in which the secondary is relatively movable with respect to the armature. For example, a plurality of pairs of the magnetic poles are extending from the base portions of the core. Among them, when a first polarity (for example, N pole) side of one pair of magnetic poles is disposed above the secondary, while a second polarity (for example, S pole) side thereof is disposed beneath the secondary, a second polarity (S pole) side of an adjacent pair of magnetic poles is disposed above the secondary, while a first polarity (N pole) side thereof is disposed beneath the secondary. In this way, when an exciting current is caused to flow through the coil wound around armature in accordance with a predetermined circuit, a plurality of alternatively arranged magnetic fields will be formed along a plurality of pairs of magnetic poles. At this time, the alternatively arranged magnetic fields will enable the secondary to have a relative movement.

In other words, it is also possible that an electric motor of the present invention comprises an armature and a relatively movable secondary. Such an electric motor may be further composed providing one side magnetic pole teeth magnetically coupled to one side magnetic pole of the armature and arranged respectively in a first stage (for example, an upper stage) and in a second stage (for example, a lower stage) disposed in a direction substantially perpendicular to the moving direction of the secondary, and the other side magnetic pole teeth magnetically coupled to the other one side magnetic pole of the armature and arranged respectively in a first stage (for example, an upper stage) and in a second stage (for example, a lower stage) disposed in a direction substantially perpendicular to the moving direction of the secondary. The magnetic pole teeth of the first stage provided on one side and the magnetic pole teeth of the first stage provided on the other side may be arranged alternatively with respect to the moving direction of the secondary. Meanwhile, the magnetic pole teeth of the second stage provided on one side and the magnetic pole teeth of the second stage provided on the other side may be arranged alternatively with respect to the moving direction of the secondary. In this way, the secondary may be disposed between the plurality of magnetic pole teeth of the first stage (provided on both one and the other sides), and the plurality of magnetic pole teeth of the second stage (provided on both one and the other sides).

DESCRIPTION OF THE PREFERRED EMBODIMENTS

Several embodiments of the present invention will be described in the following with reference to the accompanying drawings. In the drawings, the elements represented by the same identical reference numerals are the same identical elements or equivalent elements.

Figure 1A:
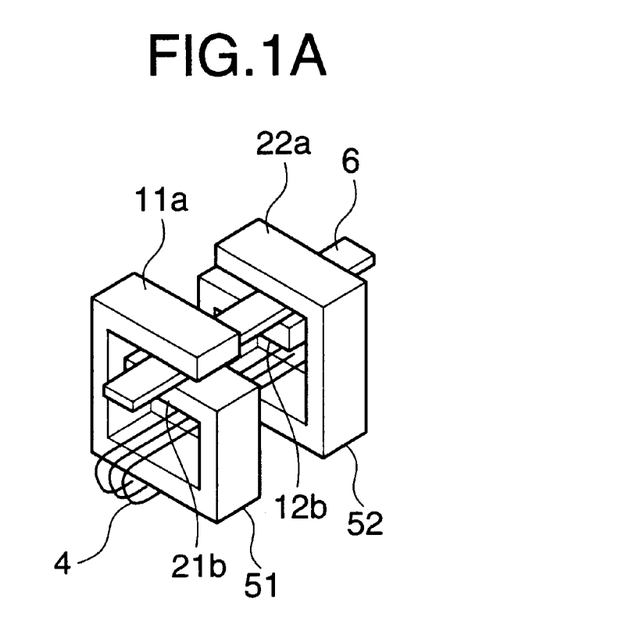
FIGS. 1A and 1B are perspective views schematically showing the basic structure of an electric motor formed according to the present invention.
Figure 1B:
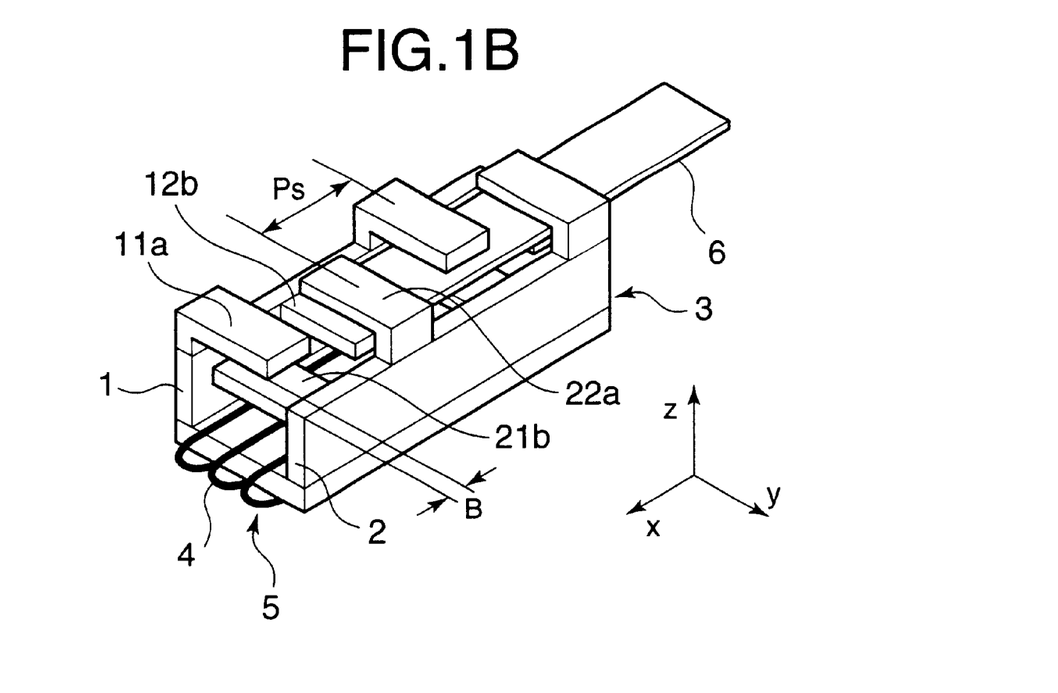

FIG. 1 is used to indicate the basic structure of an electric motor formed according to one embodiment of the present invention.

Figure 2A:
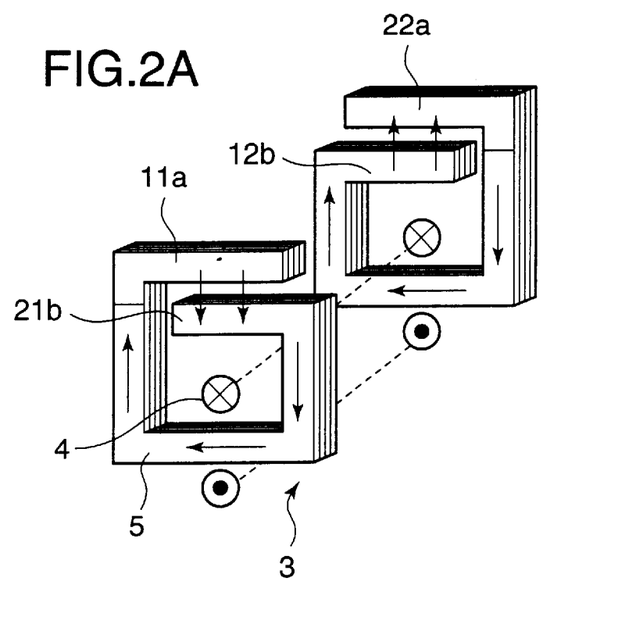
FIGS. 2A and 2B are perspective views schematically showing how to assemble an electric motor of the present invention, which is formed by magnetic flux flows and laminated steel sheets.
Figure 2B:
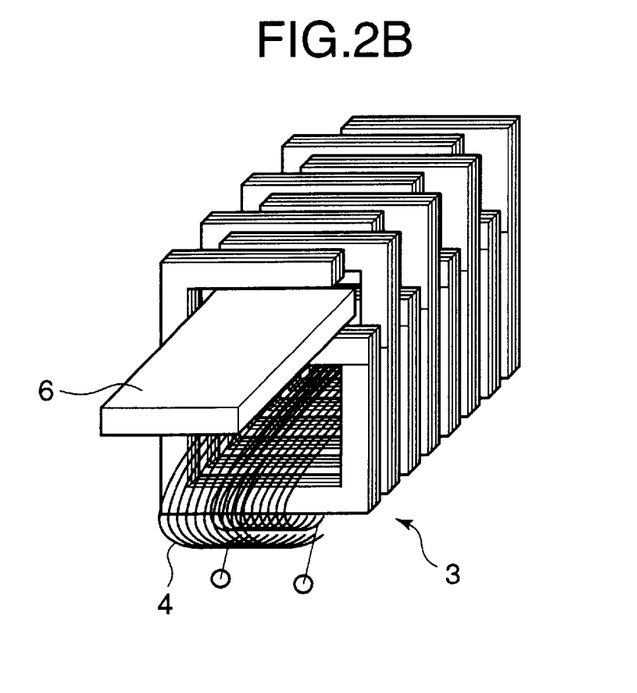

In detail, FIG. 1A shows the basic structure of an electric motor formed according to one embodiment of the present invention, while FIG. 2B shows a schematic example in which the motor basic structure has been multi-polarized.

Referring to FIG. 1A, reference numeral 51 represents a core having first type facing portions, reference numeral 52 represents another core having second type facing portions. The core 51 and the core 52 are arranged in a manner such that their upper and lower magnetic polarities are different from one another. Namely, the cores (51, 52) are formed into rectangular spirally wound configuration, with straight portions on both ends of one core 51 facing the straight portions on both ends of the other core 52, thereby forming upper and lower magnetic poles. In more detail, several pairs of the core 51 and the core 52 may be arranged concentrically and arranged a spirally winding direction of each pair of them in mutually opposite directions.

Here, an upper magnetic pole tooth 11a and a lower magnetic pole tooth 21b of the core 51 are defined as first type facing portions, a lower magnetic pole tooth 12b and an upper magnetic pole tooth 22a of the core 52 are defined as second type facing portions. In this way, an armature can thus be formed in a manner such that No. (2n–1) core provide the first type facing portions, while No. (2n) core provide the second type facing portions (however, n=1, 2, 3, . . . ).

Further, as shown in FIG. 1A, the core 51 and the core 52 have a winding coil 4. However, it is also possible that the coil 4 may be divided into several portions when it is caused to wind around the core.

In fact, an electric motor of the invention is characterized in that a secondary 6 is disposed between the first type facing portions of the core 51, and also between the second type facing portions of the core 52, so that the secondary 6 is movable relatively to an armature 3. In fact, the armature 3 is comprised of the core 51, the core 52 and the coil 4, while the secondary 6 is comprised of a permanent magnet, a magnetic material and a non-magnetic material.

Further, there is formed a gap 8 between the upper magnetic pole teeth (11a, 22a) and the lower magnetic pole teeth (21b, 12b) of the core. When the secondary 6 is passed through the gap 8, the secondary 6 will be disposed between the first type facing portions, as well as between the second type facing portions. In this way, an armature 3 can thus be provided in the electric motor of the present embodiment, in a manner such that the gap 8 formed between the upper magnetic pole teeth (11a, 22a) and the lower magnetic pole teeth (21b, 12b) of the core can enable the magnetic flux to flow alternatively to the upper and lower magnetic poles, with the secondary 6 being relatively movable through the gap 8.

FIG. 2 is a schematic view showing a concept indicating the flow of magnetic flux in an electric motor formed by laminating together a plurality of steel sheets.

By forming the above construction, as shown in FIG. 2A, an armature 3 can be provided in the electric motor, in a manner such that the gap 8 formed between the upper magnetic pole teeth (11a, 22a) and the lower magnetic pole teeth (21b, 12b) of the cores can enable the magnetic flux to flow alternatively to the upper and lower magnetic pole teeth, with the secondary 6 being relatively movable through the gap 8.

Further, in the electric motor of the present embodiment, since an attraction acting between the secondary 6 and the upper magnetic pole teeth (11a, 22a) is substantially equal to an attraction acting between the secondary 6 and the lower magnetic pole teeth (21b, 12b), and since the two attractions act in mutually opposite directions, a finally formed attraction is small. For this reason, it is possible to reduce an undesired attraction acting between the secondary 6 on one hand and the magnetic poles of the armature 3 on the other, thereby alleviating a load on the support structure of the motor.

Referring to FIG. 2B, the core section of the armature 3 comprises a plurality of laminated steel sheets, forming a structure in which a plurality of the first type facing portions and a plurality of the second type facing portions are alternatively arranged in a manner shown in the drawing. In fact, the core section in which a coil 4 of the armature 3 is disposed, and the magnetic poles having the facing portions (with the secondary 6 interposed therebetween), may be at first manufactured separately using the laminated steel sheets, and then assembled together.

Figure 3:
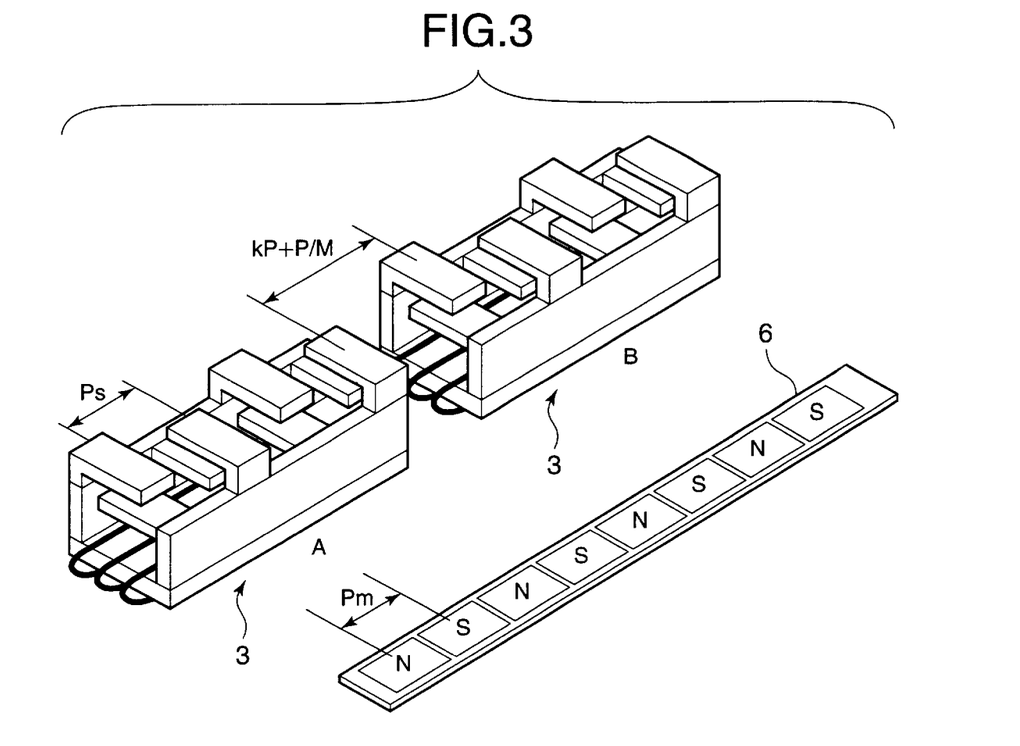
FIG. 3 is a perspective view schematically showing an embodiment for disposing an electric motor formed according to the present invention.

FIG. 3 is a schematic view showing an embodiment indicating how the electric motor of the present invention can be formed.

As shown in FIG. 3, two armatures 3 are arranged in series. A phase difference of electric angle 90 degrees is formed between phase A and phase B, thus effecting a change-over between two coils 4, thereby generating a mobile magnetic field and enabling the secondary 6 to have a relative movement.

On the other hand, even if a plurality of such electric motors of the present invention are arranged in parallel with one another with a plurality of secondaries formed into an integral arrangement, it is still possible to obtain the same effect as described in the above.

When a plurality of armatures 3 of the electric motors are line up with a pole pitch being P, a pitch between magnetic pole teeth of the armatures 3 which are adjacent to each other but have different phases is $(k \cdot P + P/M)$ {(k=0, 1, 2, . . . ), (M=2, 3, 4, . . . )} {here, k is a number freely selectable within a range possible for neighbouring armatures 3 to be arranged, M is the number of the phases of the motors}.

Although the present embodiment of the invention has been described with reference to a sigle-phase motor and a two-phase motor, the present invention can also be applied to a multiphase motor such as a three-phase motor, a four-phase motor and a five-phase motor.

Figure 4:
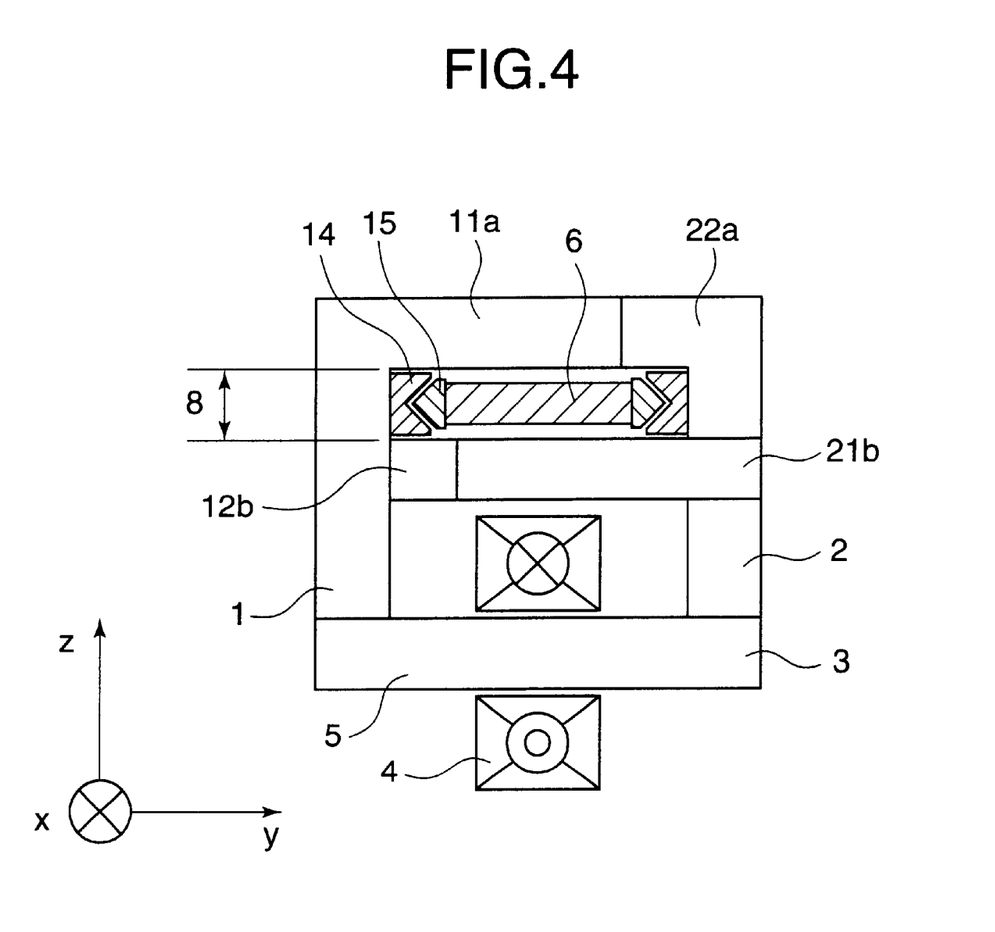
FIG. 4 is a cross sectional view schematically showing an electric motor formed according to the present invention.

FIG. 4 is a cross sectional view showing the electric motor formed according to the present embodiment of the invention.

Referring to FIG. 4, a support structure 14 is provided on the armature 3 and a support structure 15 is provided on the secondary 6, thus forming an overall support structure capable of supporting the secondary 6. In this way, the secondary 6 is supported by both the support structure 14 and the support structure 15, and is relatively movable through the gap 8 as if it passes a tunnel.

Figure 5A:
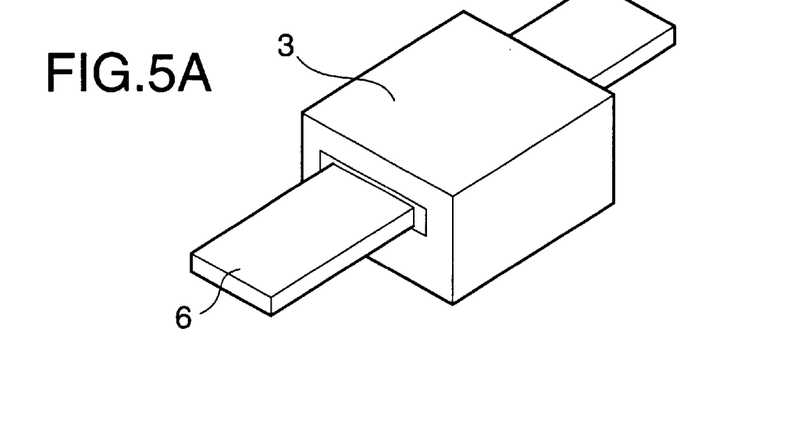
FIGS. 5A, 5B and 5C are perspective views schematically showing embodiments in which several different armatures have been molded according to the present invention.
Figure 5B:
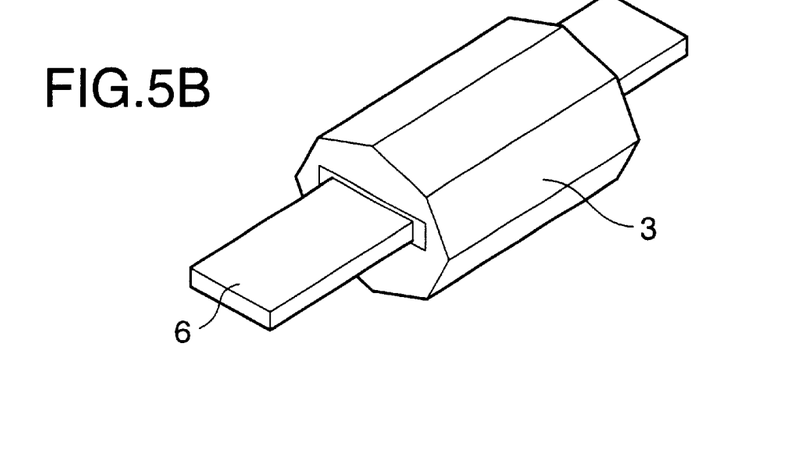
Figure 5C:
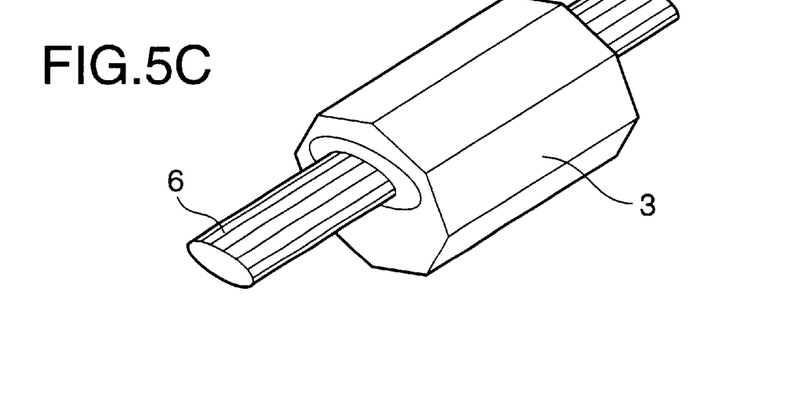

FIG. 5 is an explanatory view showing another embodiment in which the armatures 3 of the electric motors of the present invention are molded.

FIG. 5 shows an image indicating several molded armatures 3 formed by dividing and assembling core sections including coils, laminated steel sheets, as well as solid members. In this way, each armature 3 is a molded body including laminated steel sheets, coils, support structures (not shown). Further, as shown in FIG. 3, a plurality of armatures 3 may be arranged in series, with phase A and phase B molded independently. On the other hand, it is also possible that a plurality of phases may be molded together. Alternatively, a plurality of armatures may be arranged in parallel with one another, with phase A and phase B molded independently, or a plurality of phases may be molded together.

The shape of each armature 3 may be made to conform to the shapes of core, so that it can be made into a square shape or a cylindrical shape. Meanwhile, its secondary 6 can also be formed into a square shape or a cylindrical shape.

Figure 6:
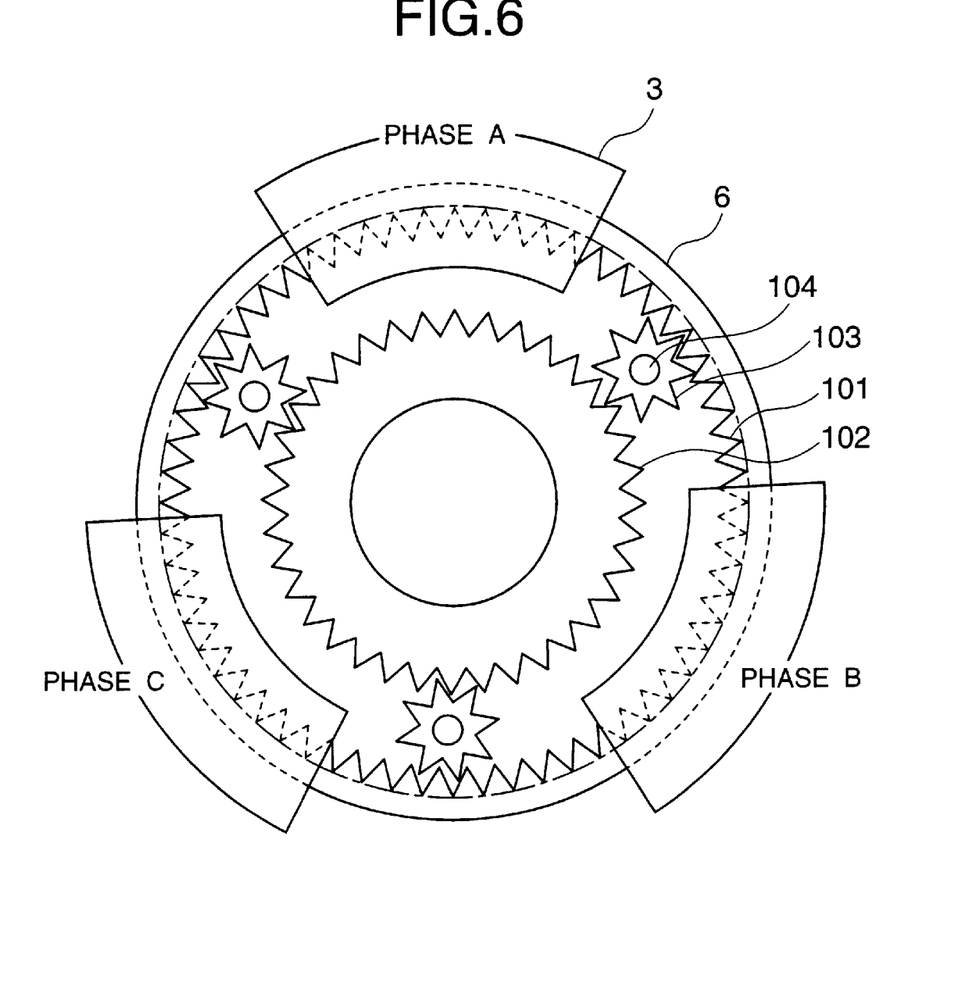
FIG. 6 is a cross sectional view schematically showing another embodiment of an electric motor formed according to the present invention (a first type rotating machine).
Figure 7:
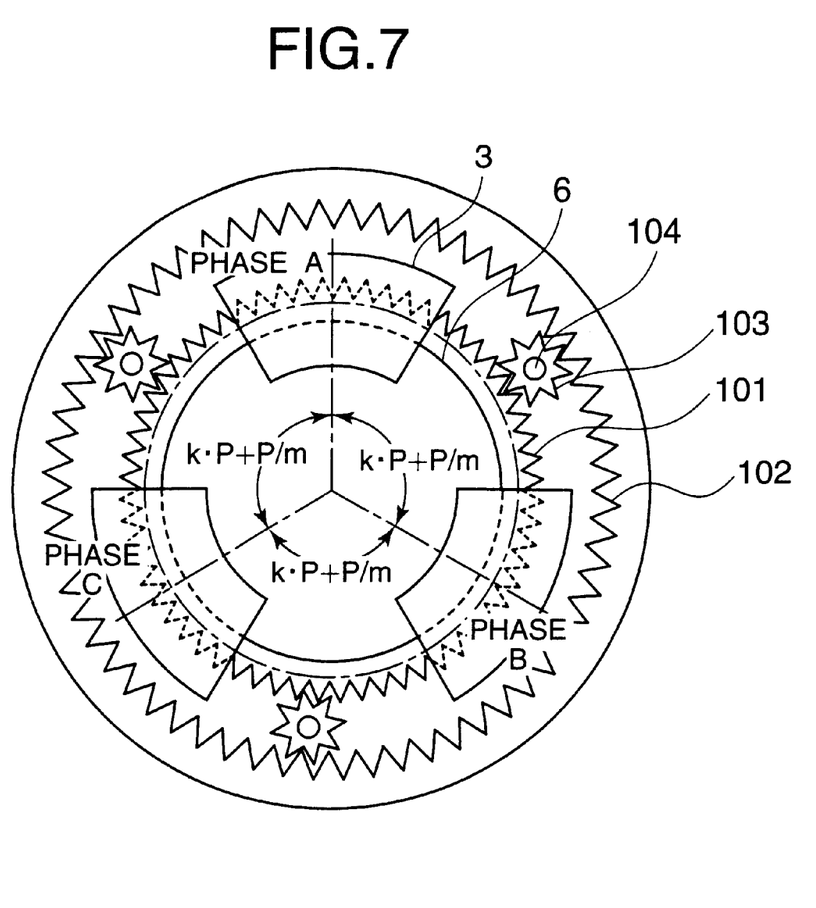
FIG. 7 is a cross sectional view schematically showing a further embodiment of an electric motor formed according to the present invention (a second type rotating machine).

FIG. 6 and FIG. 7 are used to indicate an embodiment in which the electric motor of the present invention has been applied to a rotating machine.

FIG. 6 shows an electric motor which is characterized in that a plurality of armatures 3 are arranged at a predetermined interval along a circumference, a secondary 6 is disposed concentrically with respect to the armatures 3, with a predetermined clearance formed therebetween, in a manner such that the secondary 6 is allowed to have a rotary movement. In detail, the secondary 6 has a first gear 101, a plurality of interposing gears 103, and a second gear 102 disposed on the inner sides of the armatures 3, in a manner such that the torque of the first gear 101 may be transmitted to the second gear 102 by way of the interposing gears 103. The plurality of interposing gears 103 are supported by shafts 104.

The basic principle of a structure shown in FIG. 7 is the same as that shown in FIG. 6. In detail, the secondary 6 has a first gear 101, a plurality of interposing gears 103, and a second gear 102 disposed on the outer sides of the armatures 3, in a manner such that the torque of the first gear 101 may be transmitted to the second gear 102 by way of the interposing gears 103.

As shown in FIG. 7, when a plurality of armatures 3 of the electric motors are line up with a pole pitch being P, a pitch between magnetic poles of the armatures 3 which are adjacent to each other but have different phases is (k·P+P/M) {(k=0, 1, 2, . . . ), (M=2, 3, 4, . . . )} {here, k is a number freely selectable within a range possible for neighbouring armatures 3 to be arranged, M is the number of the phases of the motors}.

Figure 8A:
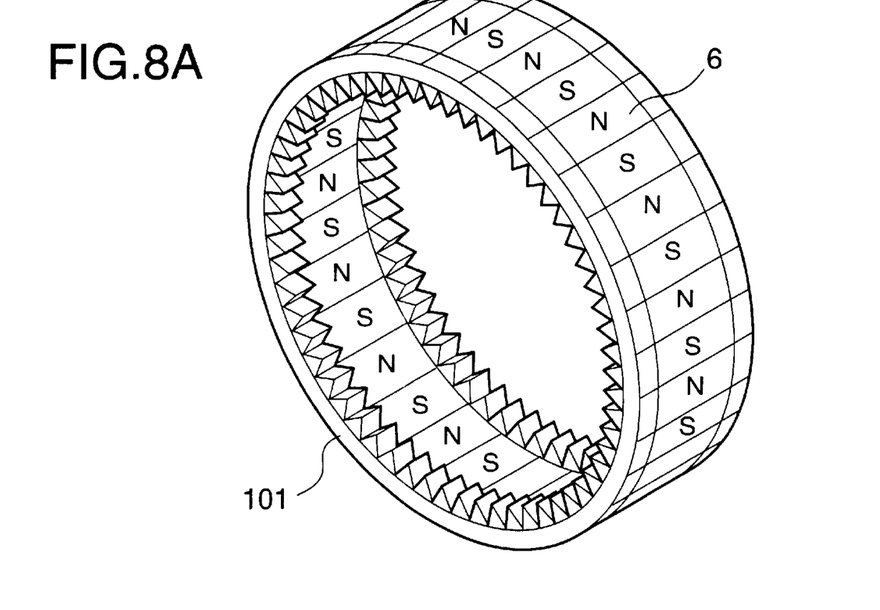
FIGS. 8A and 8B are perspective views each schematically showing a secondary of an electric motor according to the present invention (a first type rotor).
Figure 8B:
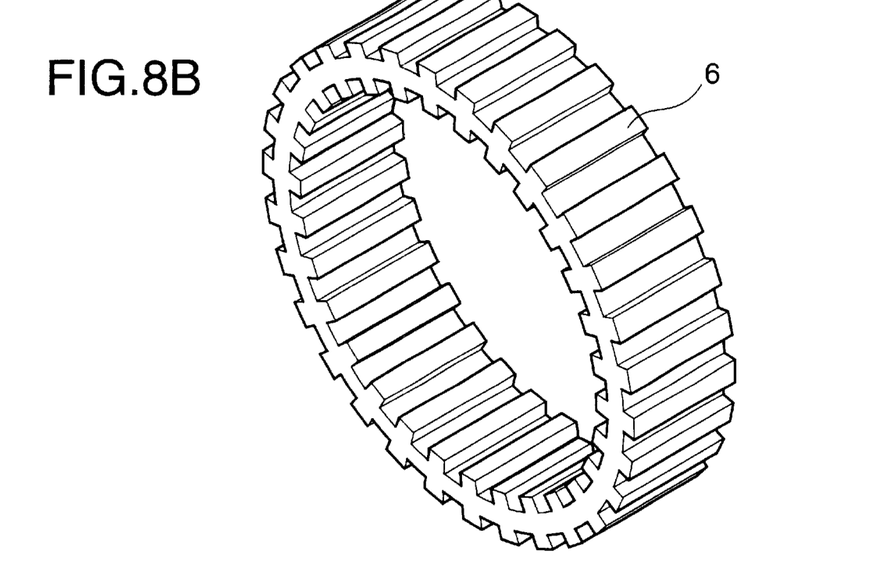

FIG. 8 shows an embodiment indicating a secondary (rotor) of an electric motor of the present invention.

FIG. 8A is a perspective view showing a structure in which the secondary 6 is formed into a rotor using a permanent magnet, with the first gear 101 provided in the secondary 6. FIG. 8B is another perspective view showing the structure of a reluctance type rotor having magnetic resistance differences caused by concave and convex portions. Here, the secondary 6 is so formed that its concave and convex structure can also be used as a first gear 101. Further, it is also allowed to use a structure formed by combining the structure shown in FIG. 8A with the structure shown in FIG. 8B.

Figure 9:
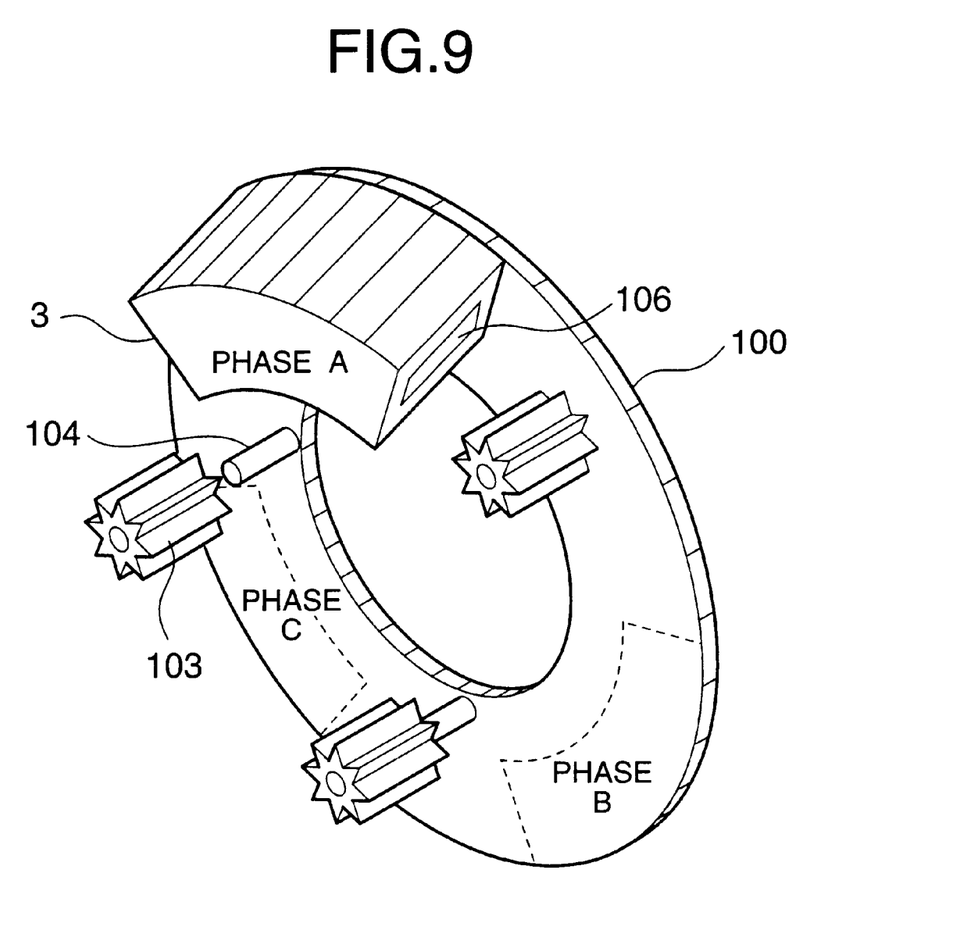
FIG. 9 is a perspective view schematically showing an embodiment of how to assemble an electric motor of the present invention.

FIG. 9 is an explanatory view showing a further embodiment of the present invention, indicating how an electric motor of the invention can be assembled.

As shown in FIG. 9, respective armatures 3 and shafts 104 for supporting the interposing gears 103 are fixed on the base 100. Each armature 3 is formed with a gap 106 adapted to allow the insertion of a secondary 6 therethrough, further has a support structure 14 shown in FIG. 4, thereby forming an integral configuration. Here, the secondary 6 has the above support structure 15 and is supported to be movable relative to the support structure 14.

Figure 10:
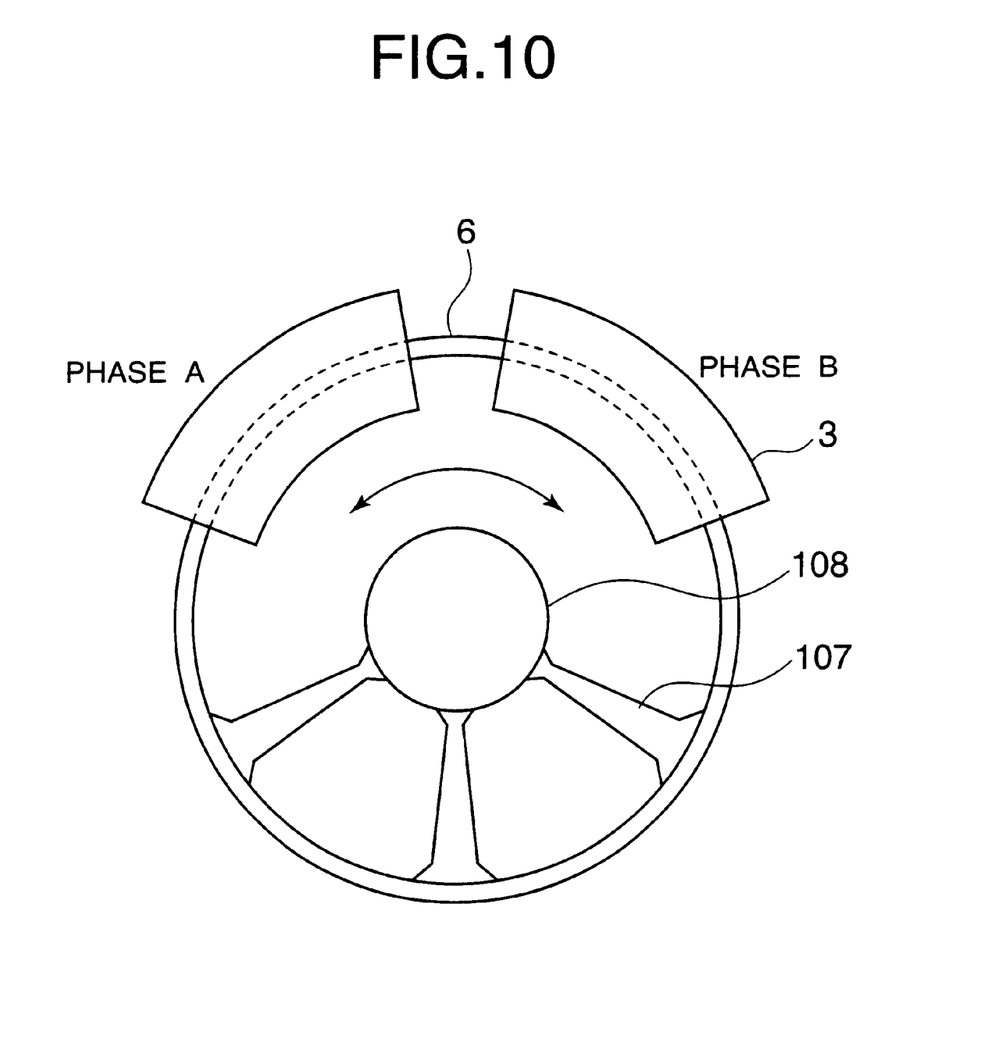
FIG. 10 is a cross sectional view schematically showing a still further embodiment of an electric motor according to the present invention (a third type rotating machine).

FIG. 10 is an explanatory view showing a still further embodiment of the present invention, indicating a rotating machine formed by an electric motor of the invention.

Referring to FIG. 10, the secondary 6 is formed to be connected with a rotating shaft 108 by way of a plurality of arm members 107. Although this is a structure not including gears shown in FIG. 6, the secondary 6 is allowed to rotate reciprocatingly within a predetermined range of an angle.

Figure 11A:
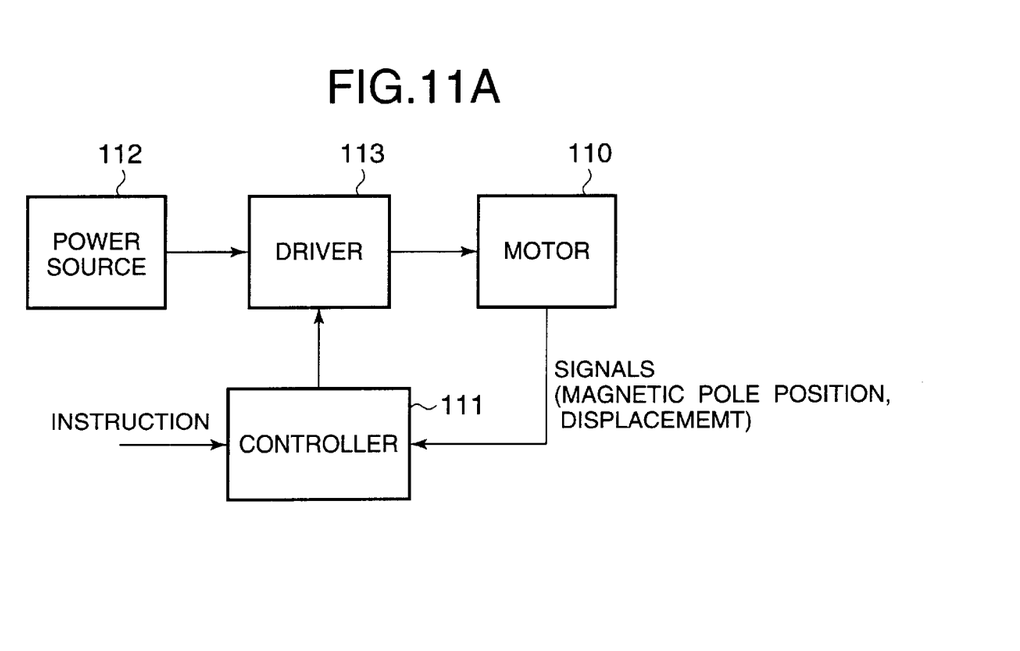
FIGS. 11A and 11B are block diagrams showing the control of an electric motor according to the present invention (a first type control).
Figure 11B:
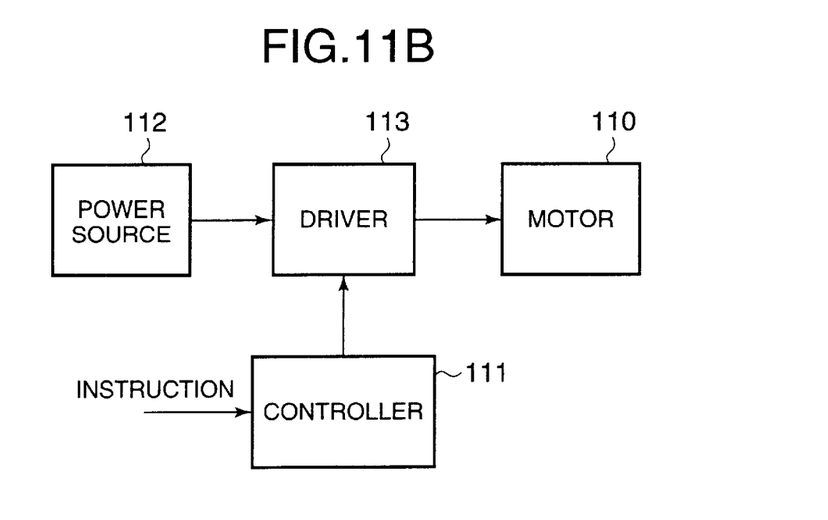
Figure 12A:
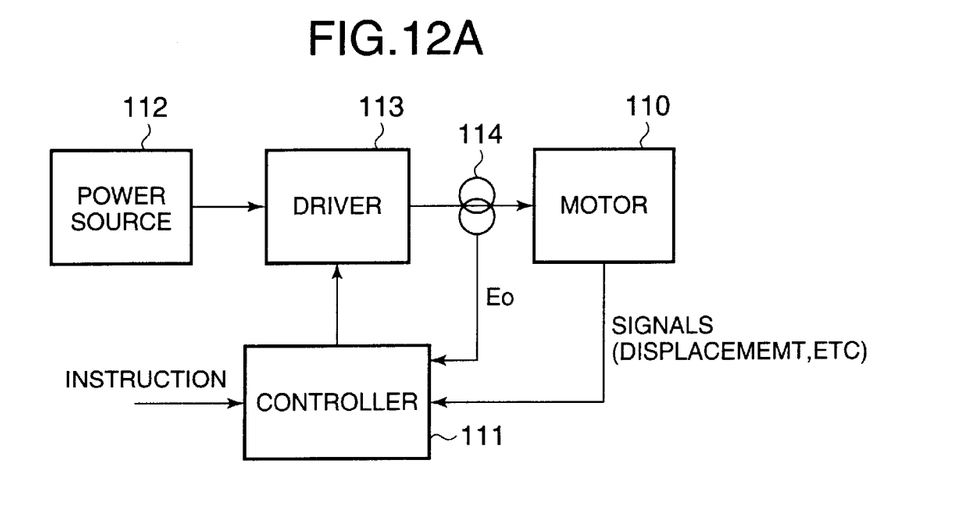
FIGS. 12A and 12B are block diagrams showing the control of an electric motor according to the present invention (a second type control).
Figure 12B:
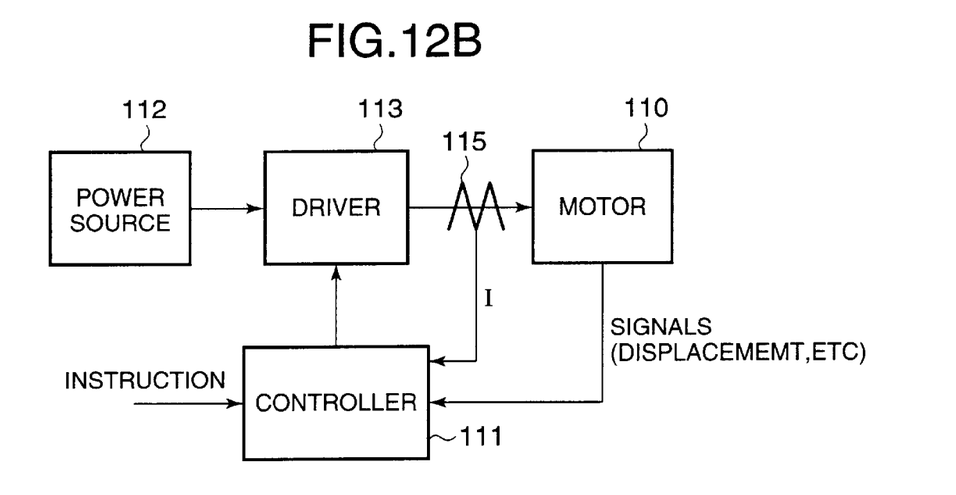

FIG. 11 and FIG. 12 are block diagrams showing control systems involving the use of an electric motor formed according to the present invention.

FIG. 11A is a block diagram indicating a close loop control system which includes an electric motor 110, a sensor (not shown) for detecting a relative displacement between the above first member and the above second member and for detecting a magnetic pole, a controller 111 for feeding back detected signals, a driver 113 for driving the electric motor by means of external/internal power sources 112. The controller 111 is adapted to receive instructions such as speed instructions from other sections.

FIG. 11B is another block diagram indicating an open loop control system which includes an electric motor 110 formed according to the present invention, a controller 111 and a driver 113.

FIG. 12A is a further block diagram indicating a control system without a magnetic pole sensor, which system includes an electric motor 110 formed according to the present invention, a voltage sensor 114, a controller 111, and a driver 113. In the present embodiment of the invention, the voltage sensor 114 is used to feed an inductive voltage Eo (generated by the electric motor) into the controller. Using the controller 111, a magnetic pole position can be estimated from the dimension of the inductive voltage, and a signal for driving the electric motor is fed to the driver 113. Further, with the use of the control system of the present embodiment, it is allowed to drive the electric motor in a stabilized manner (not having a loss of synchronism), without having to attach a magnetic pole position sensor to the electric motor.

FIG. 12B is a still further block diagram showing a still further control system without a magnetic pole position sensor, which system includes an electric motor 110 formed according to the present invention, a current sensor 115, a controller 111, and a driver 113. In the present embodiment of the invention, the current sensor is used to feed an electric current I (flowing into the electric motor) into the controller. By means of the controller 111, a voltage applied to the electric motor and a detected current value may be used to calculate an inductive voltage of the electric motor, thereby making it possible to deduct a magnetic pole position. In this way, by using the control system of the present embodiment, it is possible to drive the electric motor in a stabilized manner (not having a loss of synchronism), without having to attach a magnetic pole position sensor to the electric motor.

Figure 13A:
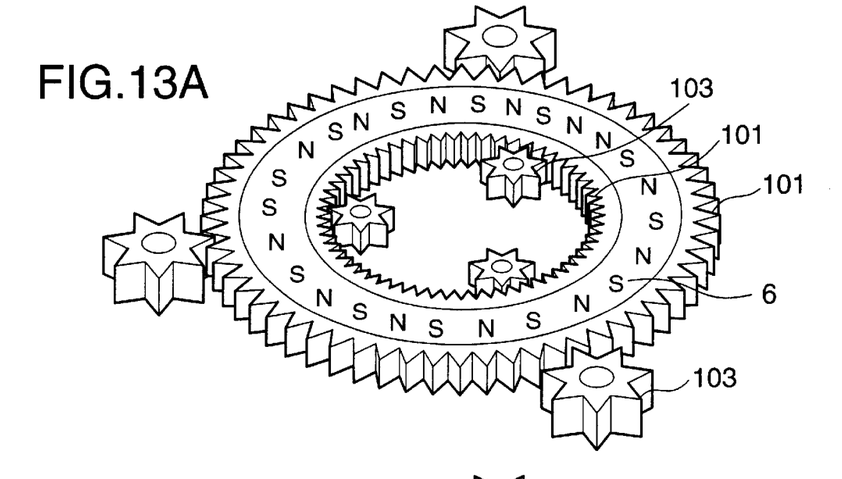
FIGS. 13A, 13B and 13C are perspective views each schematically showing a secondary of an electric motor according to the present invention (a second type rotor).
Figure 13B:
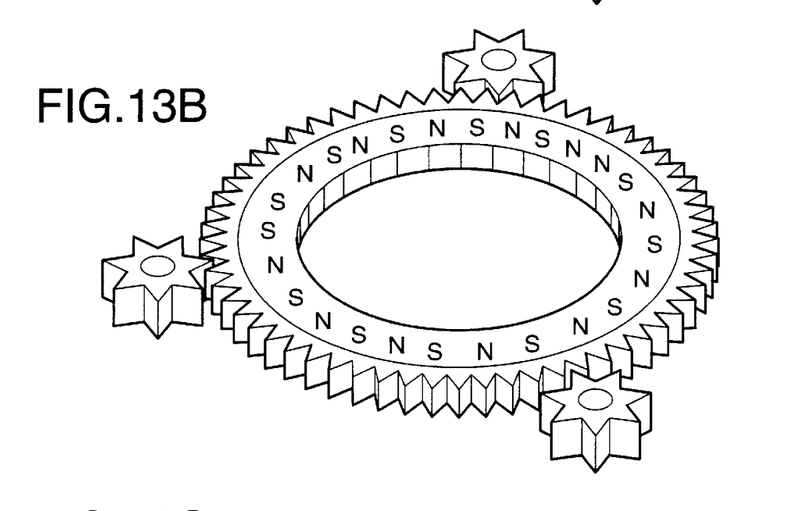
Figure 13C:
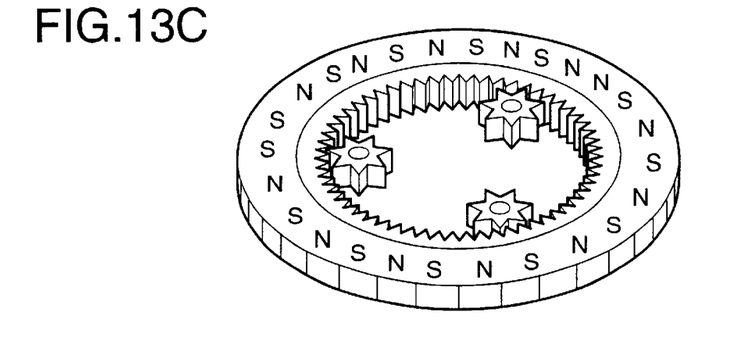

FIG. 13 is an explanatory view showing a further embodiment of the present invention, indicating a rotating machine formed by the electric motors of the invention.

Referring to FIG. 13, the rotating direction of the secondary 6 and the orientation of the first gear 101 are different from those of the secondary 6 shown in FIG. 8. At this time, as a method of attaching the interposing gears 103 to the first gear 101, a necessary step is to perform position adjustment to dispose the interposing gears and first gear in proper positions with respect to the second gears 102.

When an electric motor of the present invention is used to form a rotating machine, it is allowed to form many magnetic poles so as to obtain a large torque. Further, using an electric motor of the present invention, it is possible to produce a rotating machine which is large in diameter but small in thickness.

Moreover, if the electric motor of the present invention is used to form a linear motor, it is allowed to form many magnetic poles so as to obtain a large thrust. Further, using an electric motor of the present invention, it is possible to reduce a load on the support structures of the motor.

It is understood from the above description that the electric motor of the present invention is so formed that its armature is fixedly supported and its secondary is made movable. However, it is also possible that the secondary may be fixedly supported and the armature is made movable.

As may be understood from the above description, with the use of an electric motor formed according to the present invention, it is possible to shorten the magnetic path of effective magnetic flux of the magnetic circuit, and it is also possible to reduce leaked magnetic flux from the magnetic poles. Therefore, it is possible to improve the efficiency of an electric motor and thus obtain an increased output of the motor.

Furthermore, with an electric motor formed according to the present embodiment, since an attraction force acting between the secondary 6 and the upper magnetic poles is the same as an attraction force acting between the secondary and the lower magnetic poles, and since the two attraction forces will act in opposite directions, a final total attraction is small. For this reason, since it is possible to reduce an attraction force acting between the secondary 6 on one hand and the magnetic poles of the armature 3 on the other, it is allowed to reduce the load on the support structure of the motor.

What is claimed is:

1. An electric motor comprising:
   an armature formed of magnetic material, said armature having two poles;
   a coil wound on said armature; and
   a secondary, said electric motor further comprising:
   first magnetic pole teeth magnetically coupled to one magnetic pole of said armature and disposed in a first stage and a second stage;
   second magnetic pole teeth magnetically coupled to another magnetic pole of said armature and disposed in a first stage and a second stage;
   wherein said armature or said secondary is movable, magnetic pole teeth in said first stage of said first magnetic pole teeth and magnetic pole teeth in said first stage of said second magnetic pole teeth are disposed alternately according to a movable direction of said armature or said secondary, and
   said secondary is disposed between magnetic pole teeth in said first stage and magnetic pole teeth in said second stage.

2. An electric motor according to claim 1, wherein the secondary and the armature are disposed on the same identical circle, with a clearance formed between the secondary and the armature, said secondary being allowed to have a rotary movement.

3. An electric motor according to claim 1, wherein a torque is transmitted from the secondary in a rotary movement, by using some interposed members.

4. An electric motor according to claim 1, wherein the secondary is disposed in a straight line, a clearance is formed between the secondary and the armature, said secondary being allowed to have a linear movement.

5. An electric motor according to claim 1, wherein when a plurality of armatures of the electric motors are arranged with a pole pitch being P, a pitch between magnetic poles of the armatures adjacent to each other but having different phases is (k.multidot.P+P/M) {(k=0, 1, 2, . . . ), (M=2, 3, 4, . . . )} {here, k is a number freely selectable within a range possible for neighbouring armatures to be arranged, M is the number of the phases of the motors}.

6. An electric motor according to claim 1, wherein when a plurality of armatures of the electric motors are arranged with a pole pitch being P, a pitch between magnetic poles of the armatures adjacent to each other but having different phases is (k.multidot.P+P/M) {(k=0, 1, 2, . . . ), (M=2, 3, 4, . . . )} {here, k is a number freely selectable within a range possible for neighbouring armatures to be arranged, M is the number of the phases of the motors}.

7. An electric motor according to claim 1, further providing an motor driving system, wherein said motor driving system has a close loop control system including the electric motor consisting of the armature and the secondary, a sensor for detecting a relative displacement between said armature and said secondary and for detecting a magnetic pole, a controller for feeding back detected signals, and a power driving section.

8. An electric motor according to claim 1, further providing an motor driving system, wherein said motor driving system has an open loop control system including an electric motor consisting of the armature and the secondary, a controller, and a power driving section.

9. An electric motor according to claim 1, further providing an motor driving system, wherein said motor driving system has a power driving section and a controller for detecting an inductive voltage of the electric motor and for estimating the relative magnetic pole positions of both the armature and the secondary in accordance with a detected voltage value.

10. An electric motor according to claim 1, further providing an motor driving system, wherein said motor driving system a power driving section and a controller for detecting an electric current flowing into the electric motor and for estimating the relative magnetic pole positions of both the armature and the secondary in accordance with a detected electric current value.

11. An electric motor according to claim 1, characterized in that the armature of the motor is fixedly supported, and said secondary is moveable.

12. An electric motor according to claim 1, characterized in that the armature of the motor is fixedly supported, and said armature is moveable.

13. An electric motor comprising:

an armature having a core formed by a magnetic material and having a coil wound around the core; and a secondary disposed within the armature with a clearance formed therebetween and supported to be relatively movable with respect to the armature; wherein the core have a plurality of pairs of mutually facing magnetic poles which are formed in a manner such that the secondary is allowed to be disposed between each pair of the magnetic poles; the plurality of magnetic poles are arranged in a direction in which the secondary is relatively movable with respect to the armature; and every two mutually neighbouring magnetic poles arranged in the relatively movable direction on the secondary side are set to have mutually different magnetic polarities, wherein when a plurality of armatures of the electric motors are arranged with a pole pitch being P, a pitch between magnetic poles of the armatures adjacent to each other but having different phases is (k.multidot.P+ P/M) {(k=0, 1, 2, . . . ), (M=2, 3, 4, . . . )} {here, k is a number freely selectable within a range possible for neighbouring armatures to be arranged, M is the number of the phases of the motors}.

14. An electric motor comprising:

an armature having a core formed by a magnetic material and having a coil wound around the core; and a secondary disposed within the armature with a clearance formed therebetween and supported to be relatively movable with respect to the armature; wherein the core have a plurality of pairs of mutually facing magnetic poles which are formed in a manner such that the secondary is allowed to be disposed between each pair of the magnetic poles; the plurality of magnetic poles are arranged in a direction in which the secondary is relatively movable with respect to the armature; and every two mutually neighbouring magnetic poles arranged in the relatively movable direction on the secondary side are set to have mutually different magnetic polarities wherein the secondary and the armature are disposed on the same identical circle, with a clearance formed between the secondary and the armature, said secondary being allowed to have a rotary movement wherein when a plurality of armatures of the electric motors are arranged with a pole pitch being P, a pitch between magnetic poles of the armatures adjacent to each other but having different phases is (k.multidot.P+ P/M) {(k=0, 1, 2, . . . ), (M=2, 3, 4, . . . )} {here, k is a number freely selectable within a range possible for neighbouring armatures to be arranged, M is the number of the phases of the motors}.

15. An electric motor comprising:

an armature formed of magnetic material having two poles; and a secondary;

wherein said armature includes a first core part having first facing portions facing each other through a first gap and a second core part having second facing portions facing each other through a second gap, said first core part and said second core part include a common coil, the magnetic polarity of said first facing portions are different and the magnetic polarity of said second facing portions are different, said first core part and said second core part are disposed alternately, and said secondary is disposed in said first gap and in said second gap.

\* \* \* \* \*